United States Patent
Cockerham

(10) Patent No.: US 10,723,377 B2
(45) Date of Patent: Jul. 28, 2020

(54) VEHICLE KINETIC CONTROL SYSTEM FOR A REAR WHEEL OF A VEHICLE

(71) Applicant: TRW Limited, Solihull West Midlands (GB)

(72) Inventor: Kevin Cockerham, Sutton Coldfield (GB)

(73) Assignee: TRW Limited, Solihull, West Midlands (GB)

( * ) Notice: Subject to any disclaimer, the term of this patent is extended or adjusted under 35 U.S.C. 154(b) by 78 days.

(21) Appl. No.: 16/098,550

(22) PCT Filed: Apr. 26, 2017

(86) PCT No.: PCT/GB2017/051170
§ 371 (c)(1),
(2) Date: Nov. 2, 2018

(87) PCT Pub. No.: WO2017/191431
PCT Pub. Date: Nov. 9, 2017

(65) Prior Publication Data
US 2019/0144032 A1    May 16, 2019

(30) Foreign Application Priority Data

May 4, 2016   (GB) .................................. 1607816.4

(51) Int. Cl.
*A01B 69/00*   (2006.01)
*B62D 5/04*   (2006.01)
(Continued)

(52) U.S. Cl.
CPC ......... *B62D 5/0484* (2013.01); *B62D 5/0487* (2013.01); *B62D 7/1581* (2013.01);
(Continued)

(58) Field of Classification Search
CPC .... B62D 5/0484; B62D 5/0487; H02P 29/032
See application file for complete search history.

(56) References Cited

U.S. PATENT DOCUMENTS

2011/0156626 A1   6/2011   Mukai et al.
2013/0200827 A1   8/2013   Kezobo et al.
(Continued)

FOREIGN PATENT DOCUMENTS

| DE | 102014100718 A1 | 6/2015 |
|----|----|----|
| EP | 2765060 A2 | 8/2014 |
| JP | 2009219223 A | 9/2009 |

OTHER PUBLICATIONS

Patents Act 1977: Search Report, Application No. GB1607816.4, dated Oct. 20, 2016.
(Continued)

*Primary Examiner* — Adam M Alharbi
(74) *Attorney, Agent, or Firm* — MacMillan, Sobanski & Todd, LLC

(57) ABSTRACT

A vehicle kinematic control circuit for a vehicle adjusts the track of one or more rear wheels of the vehicle through a limited angular range, using an electric motor, connected mechanically to at least one rear wheel. The motor has at least two independently operable sets of phase windings, each set comprising at least two phase windings, each set connected to a motor bridge, controlled by a microcontroller. In normal use the microcontroller generates motor control signals that apply appropriate PWM modulated voltage waveforms to the set of phase windings connected to that bridge to drive the rotor of the motor in a first manner thereby to actively steer the rear wheel. A fault detection circuit monitors the operation of the one microcontroller, the motor bridge driver circuit, and the two sets of phase windings, to detect a fault condition, and in the event of a fault condition being detected causes one of the non-faulty motor bridges and an associated non-faulty set of phase windings to be operated to drive the rotor of the motor in a second, different manner.

21 Claims, 5 Drawing Sheets

(51) Int. Cl.
    *B62D 7/15*         (2006.01)
    *H02P 29/032*     (2016.01)
    *H02M 7/5387*     (2007.01)
    *H02P 27/08*      (2006.01)
    *H02P 29/028*     (2016.01)
    *H02P 29/024*     (2016.01)

(52) U.S. Cl.
    CPC ........ *H02M 7/53871* (2013.01); *H02P 27/08* (2013.01); *H02P 29/028* (2013.01); *H02P 29/032* (2016.02); *H02P 29/0241* (2016.02)

(56) References Cited

U.S. PATENT DOCUMENTS

| | | |
|---|---|---|
| 2013/0299271 A1 | 11/2013 | Endo et al. |
| 2013/0345934 A1 | 12/2013 | Sekiya et al. |
| 2014/0246999 A1 | 9/2014 | Kezobo et al. |
| 2016/0248317 A1* | 8/2016 | Taguchi .................. H02M 1/32 |
| 2018/0154931 A1* | 6/2018 | Shinkawa ............ B62D 5/0496 |

OTHER PUBLICATIONS

PCT International Search Report and Written Opinion, Application No. PCT/GB2017/051170, dated Sep. 11, 2017.

\* cited by examiner

VEHICLE KINETIC CONTROL SYSTEM FOR A REAR WHEEL OF A VEHICLE

CROSS-REFERENCE TO RELATED APPLICATIONS

This application is a national stage of International Application No. PCT/GB2017/051170, filed 26 Apr. 2017, the disclosures of which are incorporated herein by reference in entirety, and which claimed priority to Great Britain Patent Application No. 1607816.4, filed 4 May 2016, the disclosures of which are incorporated herein by reference in entirety.

BACKGROUND TO THE INVENTION

This invention relates to vehicle kinematic control systems of the kind that include an electric motor that is operable to alter the track of at least one rear wheel of a front wheel steer vehicle.

Most road going vehicles, in particular passenger cars, vans, lorries, trucks, buses and so on are conventionally steered by a driver operating a steering wheel to turn the front wheels of the vehicle. By turn we mean vary the track of the front wheels.

In addition, it is known to provide an additional amount of steering of the rear wheels of the vehicle in combination with the steering of the front wheels to improve the vehicle kinematics. Active kinematic control allows the track of both rear wheels of the vehicle to be regulated actively and independently for each wheel thus ensuring high steering precision. Thus, it may be used to improve for example agility and handling when parking, driving at low speeds and in city traffic. This is achieved by counter-steering the back wheels. At the same time, the turning circle of the vehicle is reduced. On the other hand, in-phase steering of the rear wheels may be used to stabilize the vehicle at high speeds, especially during evasive and lane change manoeuvres.

The benefits of the additional rear steering are especially noticeable in a high performance vehicle such as a sports car or supercar, where the stability of the vehicle during lane changes can be optimized at high speeds yet at the same time the manoeuvrability at low speeds can be optimized.

The turning of the rear wheels is achieved by varying the track of the rear wheels relative to the vehicle chassis, and this can be conveniently achieved by attaching a track rod of the rear wheel hub assembly to an end of an axially movable rack of a rack and pinion gearbox, the pinion of the gearbox being driven by an electric motor. A motor controller provides drive signals to the motor that are required to achieve the desired position of the rack and hence the track of the rear wheel. For convenience, the centre position of the motor may be defined as the position at which the rear wheels track dead ahead.

Both of the rear wheels may be turned together using a single motor, or there may be a motor provided for each of the rear wheels. Generally the vehicle will have a single pair of rear wheels, although more than one pair can be provided for a larger vehicle such as an over length truck.

A problem can occur when the motor fails with the track of the rear wheels in an off-centre position, i.e. both rear wheels not in line with the chassis main axis. This is a low risk failure because the steering angle possible from the rear wheels is generally much lower than the steering angle that can be applied to the front wheels, perhaps at most 3 degrees from the straight ahead, allowing the driver to compensate for the failure by adding a little more or a little less steering angle to the front wheels. Nevertheless, any fault could lead to an unusual sensation to the driver as the vehicle crabs along the road as if it is in a permanent state of oversteer or understeer. If the motor is moving rapidly and randomly it could also be distracting to the driver and lead to reduced confidence in the vehicle handling.

SUMMARY OF THE INVENTION

A feature of the present invention is to ameliorate the problems outlined above.

According to a first aspect the invention a vehicle kinematic control circuit for a vehicle, the circuit in use adjusting the track of one or more rear wheels of the vehicle through a limited angular range, in which the circuit comprises:

an electric motor, the motor in use being connected mechanically to at least one rear wheel of the vehicle such that angular movement of the rotor of the motor causes an angular variation of the track of the rear wheel, the motor comprising a stator and a rotor and at least two independently operable sets of phase windings, each set comprising at least two phase windings, a motor bridge driver circuit comprising at least two motor bridges, a first one of the motor bridges being connected to one of the sets of phase windings and the second motor bridge being connected to a different set of the set of phase windings, and one or more microcontrollers which each generate motor control signals for supply to at least one associated motor bridges, whereby in normal operation at least one of the microcontrollers generates motor control signals that are passed to the at least one associated motor bridge in turn to apply appropriate PWM modulated voltage waveforms to the set of phase windings connected to that bridge to drive the rotor of the motor in a first manner thereby to actively steer the rear wheel, and characterised by further comprising:

a fault detection circuit which monitors the operation of the at least one microcontroller, the motor bridge driver circuit, and the at least two sets of phase windings, thereby to detect a fault condition, in which in the event of a fault condition being detected the circuit is adapted to cause one of the non-faulty motor bridges and an associated non-faulty set of phase windings to be operated to drive the rotor of the motor in a second, different manner.

The microcontroller(s), motor bridges and sets of windings may be arranged to form at least two lanes, with each lane comprising one microprocessor, one bridge and one set of phase windings. The two lanes may share a common microprocessor where only one microprocessor is provided, or may have their own microprocessors. When a fault is detected in one lane, the other lane may be used in the fault mode. Of course, components in one lane may be combined with components of another to produce a new non-faulty lane for use in the fault condition, such as when one microcontroller and one bridge are both at fault from different lanes.

By drive the rotor of the motor in a first manner we mean that the currents flowing in the motor phase windings, generated using appropriate PWM modulated voltage waveforms, cause the rotor of the motor to move at a set speed or to a set absolute position as determined by the microcontroller to provide a degree of active rear wheel steering to assist the driver.

By drive the motor in a second, different, manner in a fault condition we may mean that the motor rotor is held or clamped in position or that movement is damped whereby the rear wheels are no longer being actively steered.

In particular the circuit may be arranged to clamp the motor rotor in position during the fault mode to prevent unwanted rear wheel steering movement. This is referred to hereinafter as clamping of the motor and may be achieved by passing a DC current in a loop around two of the motor phases.

In an alternative, the circuit may on entering a fault mode apply currents to the non-faulty phase that cause the rear wheel to be driven to a predefined track position such as a straight ahead position. In this mode, PWM voltage waveforms may be applied to drive the motor until a predetermined wheel track is reached, after which the PWM waveforms are stopped.

Thus, after driving the motor to a predefined position the circuit may clamp the motor in that position by passing a suitable DC current through two of the phases.

In another arrangement, rather than initially driving the rear wheel to a predetermined position or clamping using DC voltages, the movement of the rotor of the motor may be damped when driven in the second fault mode of operation. To provide the damping two or more phase windings may be short circuited together to form a closed loop. Damping may allow some movement of the rear wheels passively due to forces acting on them as the vehicle is driven but they are no being actively steered but actively resisted against steering by the damping.

The skilled person will understand how to configure the microcontroller to provide suitable motor position control for an electric motor during the first (normal) drive mode and the second (fault) mode.

Each of the sets of phase windings may comprise three or more phase windings that may be connected in a star or delta formation. Each set may be fully independent of the other, with its own separate star point for instance. Thus, there can be no flow of current from one set of phases into the other.

During normal use the two sets may be connected as a single larger bridge and set of phase windings. For instance, if both sets comprise three phase windings and a three phase bridge they may in normal drive operate as a single six phase set of phase windings and a six phase bridge.

To achieve this, the two sets may be connected at a common star point so that may during normal operation be driven as a single set of connected phases, upon entering the fault mode one set being driven independently of the others.

An isolation switch may be provided that is normally closed so that the two sets are normally interconnected during normal operation, the switch being opened when a fault is detected to allow one set to be driven fully independently of the other set.

By providing a motor with two independent sets of phase windings, and a pair of motor bridge drivers, the movement of the motor rotor can be controlled even when a fault has been detected in the operation of one of the phase windings or associated bridge or microcontroller by use of the other set of phase windings and associated bridge to damp or clamp the rotor. The two phase winding sets provide some built in redundancy so that following a Single Point Failure, one Motor Bridge will still be functional i.e. capable of creating some damping of the movement of the motor that helps prevent rapid uncontrolled movements of the motor and hence the track of the rear wheels.

In normal use, both sets of windings and the corresponding bridge driver circuit may be operated to drive the motor so that the two work in tandem. This is beneficial as the current that must flow in each phase winding will be half of that require if only one was driven, so the current in each phase winding is relatively lower. In this arrangement, in the event that a fault is detected with one set of phase windings or the associated driver or microcontroller the system is arranged to stop using one set associated with the fault whilst the other set is used to damp the movement of the motor or to clamp the rotor.

In an alternative, during normal operation one set of phases are used to drive the motor whilst the other set of phases are held in an inactive state where they do not provide drive to the motor, in the event of a fault being detected that affects the drive of the motor the other set of windings being operable to provide the damping.

The kinematics control circuit may include additional control circuitry that in a fault state provides the required signals for operation of the bridge switches of the other (non-faulty) bridge driver/phases.

The additional circuitry may provide control signals to the other (non-faulty) bridge driver that are additional to or that replace the control signals generated by the at least one microcontroller. This circuitry may be fully independent of the microcontroller, allowing effective operation to provide damping in the event of a fault with the microcontroller.

The additional circuitry may be located in series between the microcontroller and the bridge driver circuit.

The fault detection circuit may comprise a watchdog that monitors the operation of the at least one microcontroller and the watchdog or the watchdog plus the microcontroller may provide the fault detection circuit functionality of monitoring the bridge driver(s) and phase windings for faults. The watchdog may provide signals to the additional circuitry when a fault is detected to cause the additional circuitry to cause the other phase windings to provide the damping.

The fault detection circuit may comprise two watchdogs, each of which monitors a respective different one of the bridge drivers for faults.

Where a watchdog is provided then a single microcontroller may be provided that provides signals for both bridges as required.

In a modification, dual microcontrollers may be provided with each microcontroller controlling one bridge and associated set of phase windings, where the fault detection circuit may be in built into the two microcontrollers such they the microcontrollers monitor the bridge drivers for faults and also monitor each other for faults. In this configuration no additional watchdog needs to be provided.

Of course, with dual microcontrollers the fault detection circuit may also include a watchdog to monitor each of the microcontrollers so that there will be two watchdogs.

The fault detection circuit may monitor both bridge driver circuits and both sets of phase windings and both microcontrollers (where provided).

In the event that a fault is detected that is associated with one of the bridges or sets of windings that in normal use drives the motor, the switches of the other bridge may be moved to a condition in which a closed loop is formed around the other motor bridge and at least two phases of that other set of phase windings which damps the movement of the motor. The drive to the motor may at the same time be disabled. This enables the so called damping to be achieved.

For example, each of the sets of phase windings may comprise three phase windings and the bridge may comprise three upper switches, each of which connects one phase to a positive supply voltage and three lower switches, each of which connects a respective phase to a negative or ground rail, and in the event of a fault the three bottom switches of the other bridge (or the three top switches) that is used to control the motor position or movement may be moved to a closed circuit position or shorted out.

Alternatively, all three (or more) of the phase windings of that other set of phase windings may be shorted together using one or more additional switches that do not form a part of the bridge circuit but are closed in response to the detection of the fault by the fault detection circuit. These switches may be normally opened. This requires additional hardware but is technically feasible.

In another arrangement, the phases of the second set of phase windings may be connected in a star formation or Delta formation with one or more isolating switches provided at the star point that in normal use are open to isolate the phases but in a fault condition are closed to form a closed loop around at least two of the phases of the second set of phase windings to damp the movement of the motor.

In the event that a fault is detected by the fault detection circuit, the faulty bridge and/or the phases of the faulty set of phases may be placed in a condition where it is unable to drive the motor. For instance a switch may be provided at the star point of the faulty set of phases, or two switches, which may be opened in a fault condition to ensure the faulty set of phases or bridge driver or microcontroller cannot drive the motor rotor.

The additional control circuit, where provided, may switch on the required upper or lower switches (e.g. MOSFETs). This could be a relatively simple logic circuit e.g. a logic circuit with "AND" type functions (AND, OR, NOR, NAND, XOR and so on) which receives as an input a signal indicating that a fault condition has been detected from the fault detection circuit, the output of which drives the switches. In the case of dual microcontrollers, the non-faulty microcontroller may provide these control signals to operate the other bridge to provide the damping.

The switches of the other bridge may be operated in response to control signals from the microcontroller, or from control signals generated by the fault detection circuit or control signals from the additional circuit.

The practical effect of providing the damping of the motor rotor is to lock it in position when the fault detection circuit detects a fault, or to rapidly decelerate the motor if it moving at high speed when the fault is detected, and the applicant recognizes that the rear wheel or wheels may end up coming to rest in a position that is offset from the straight-ahead condition. This will result in the vehicle crabbing slightly down the road when driven in a straight line but this will generally be acceptable as it gives a predictable steering kinematics and may not even be noticed by many drivers if the range of rear track angles permitted is low, i.e. less than 3 degrees or so either side of the straight ahead position.

To ensure adequate damping, the configuration of the phase windings of the second set of phase windings should be such that the back EMF generated (motor braking torque) is sufficiently great that it exceeds the torque that can be applied to the rear wheels by motion of the vehicle along a highway by an amount sufficient to limit the rate of change of angle of the rear track to a predefined maximum rate of change. Where clamping is used, the back EMF should exceed the torque that can be applied so that the rotor is trapped in position by the magnetic field created by the current flowing in the phases.

Generally during driving there will be a relatively low torque applied to the motor because the side forces on the wheels will in turn be relatively low. The rotor only has to be to provide enough damping to resist these forces if the first phase windings are inactive, e.g. no drive voltages applied to them or held open phase. If the road wheels try to adjust their track slowly, the friction in the system will generally be enough to hold the wheels in line. If they try to move more rapidly, this will cause the motor to rotate rapidly which creates a high back EMF that resists the movement.

Two or more of the phases of the other set of phases may be shorted, and preferably all of the phases of this other set of phases may be shorted out, to provide the damping of the rotor.

In the alternative to damping, the so called clamping arrangement, a current is driven around at least two phases that are not faulty which in effect locks the rotor against rotation. The current must be relatively high to provide full clamping, and some control and monitoring circuitry may be provided to ensure that the current is not so high as to damage the phase windings or the associated bridge.

The microcontroller, or dual microcontrollers, may in normal use drive the motor to cause the rear track to change in phase with the track of the front wheels or to drive it to change track out of phase with the front wheels of the vehicle.

The vehicle kinematic control system may include a timer which is triggered when a fault is detected by the fault detection circuit and whereby upon reaching a predefined elapsed time generates an alert signal or reduces the operating capabilities of the vehicle. It may for instance issue a fault alert to the driver or put the vehicle into a safe or limp home mode if the fault persists.

The vehicle kinematic control circuit may comprise a part of a front wheel steer vehicle in which the motor is connected to at least one rear wheel of the vehicle. The vehicle may have four wheels—two steered front wheels and two rear wheels controlled by the vehicle kinematic control circuit of the invention.

The vehicle kinematic control circuit may include a rack and pinion, the rack in use being connected to at least one rear wheel carrier and the pinion being fixed to and rotating with the motor rotor. The pinion may be an integral part of the motor rotor. The motor, pinion and at least part of the rack may be housed within a common housing, which may also house the bridges, bridge drivers and the at least one microcontroller.

The vehicle may include two vehicle kinematic control circuits, each one including a motor associated with a respective rear wheel of the vehicle. When a fault is detected by the fault detection circuit of one circuit the operation of both the kinematic circuits may be varied to respond to the fault.

A single fault detection circuit may be provided for the two kinematic control circuits, monitoring both motors and both bridge driver circuits.

In an alternative one motor may be connected to two rear wheels of a vehicle to control the track of both wheels at the same time.

The motor may comprise a DC electric motor having three phases per set of phase windings. The invention may be applied to motors that have more than three phases in either the first or second set of phase windings.

Other advantages of this invention will become apparent to those skilled in the art from the following detailed description of the preferred embodiments, when read in light of the accompanying drawings.

DETAILED DESCRIPTION OF THE INVENTION

Figures 1A, 1B, 1C:
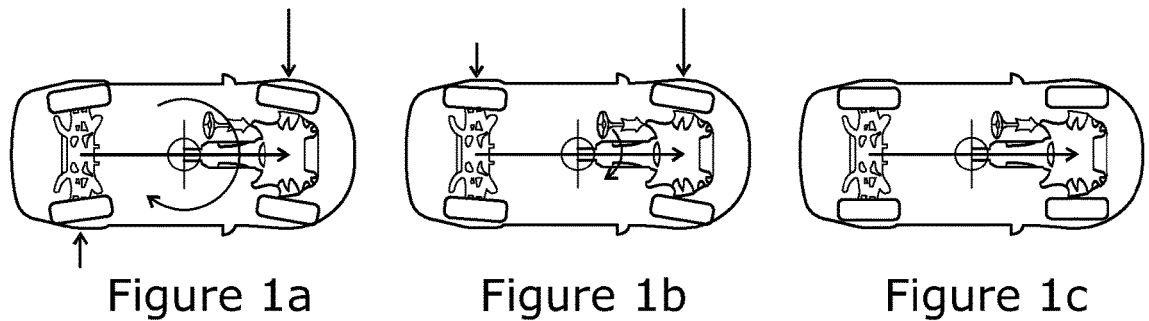
FIGS. 1a to 1c are diagrams showing the effect of changing the rear wheel track on vehicle kinematics for a front wheel steer vehicle.

FIGS. 1a to 1c show how a vehicle reacts to different operational settings of rear wheel track on a normally front wheel steered vehicle. Firstly, at slow speeds, the rear wheels may be steered in a direction opposite to those of the front wheels. This gives the vehicle a greater degree of agility and handling, including the provision of a smaller turning circle. During manoeuvres at higher speeds, such as above approximately 60 kilometres per hour, the rear wheels may be steered in the same direction as the front wheels. This makes the effective wheelbase of the vehicle longer, giving greater stability and better high speed handling, increasing safety, as shown in FIG. 1b. Finally, in FIG. 1c, during driving when no steering input is provided at the front-end, no steering is provided at the rear.

Figure 2:
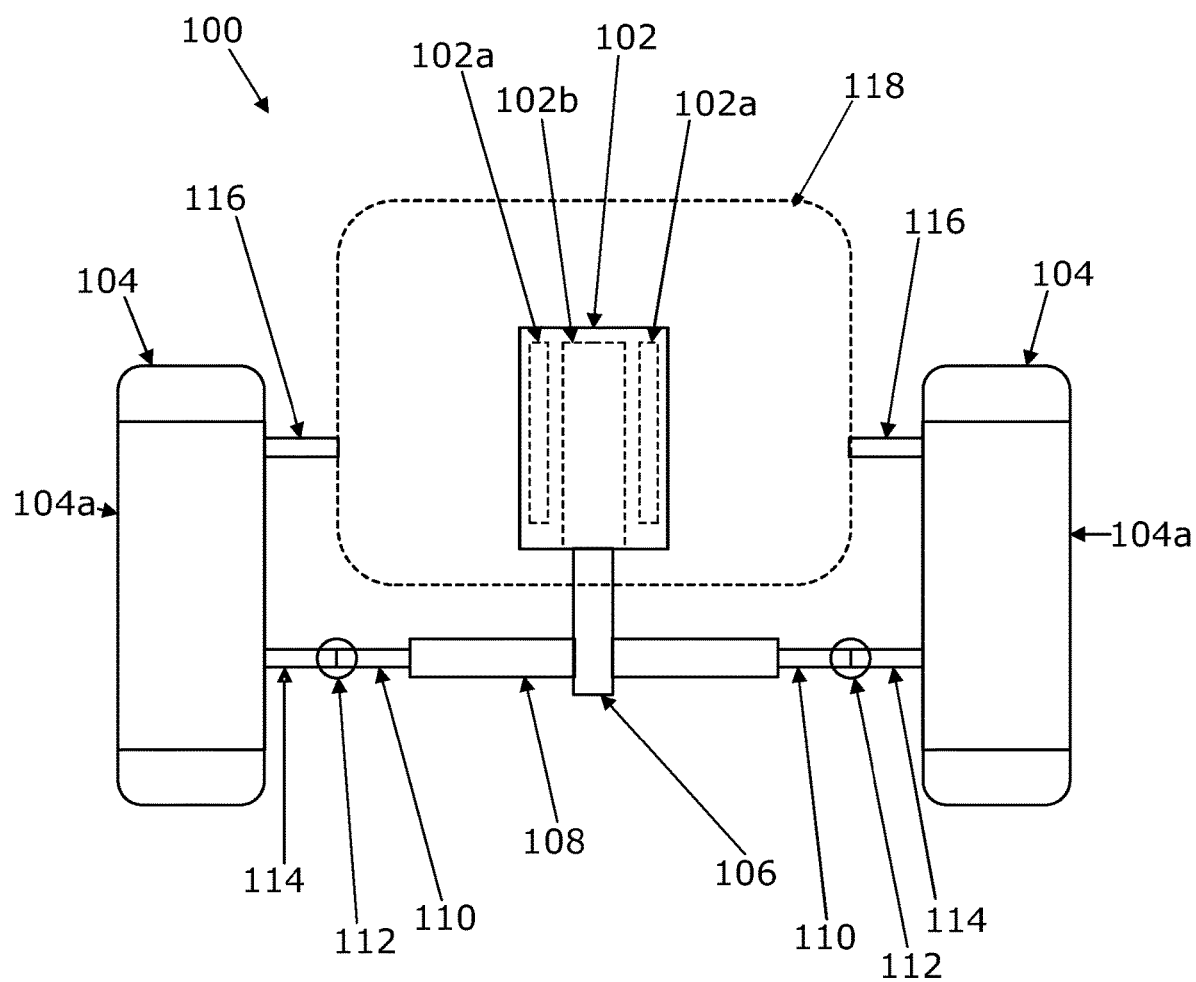
FIG. 2 is a simple schematic showing the interconnection of the key parts of an embodiment of an active kinematic control system that include a control circuit according to the present invention.

As shown in FIG. 2 an active kinematic control circuit 100 according to the present invention comprises a motor 102 that is connected mechanically to the two rear wheels 104 of a vehicle. Although not shown in FIG. 2 the vehicle may be a sports car or other performance road passenger vehicle.

Figure 5:
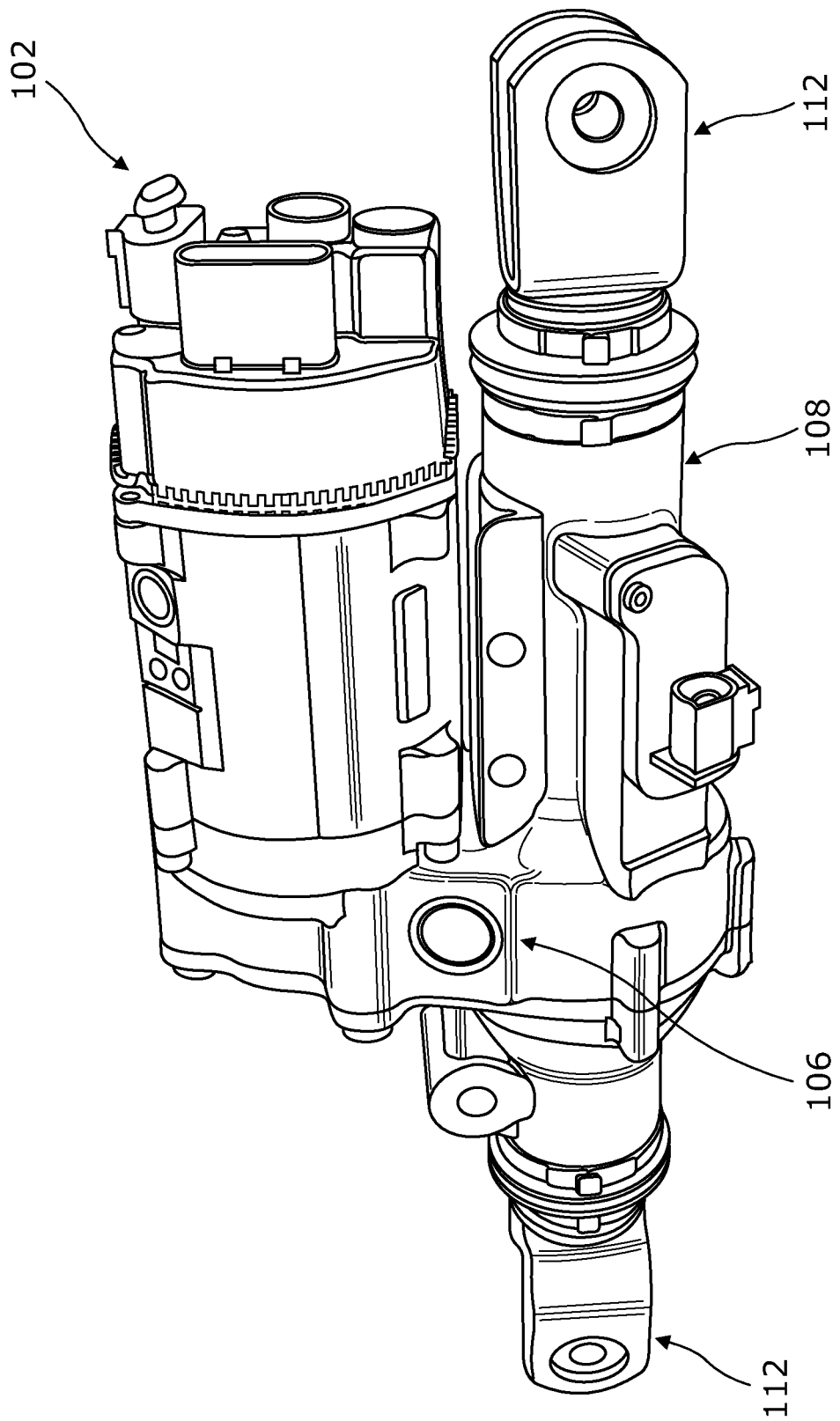
FIG. 5 is an image of the motor, rack and pinion of the system of FIG. 1 as developed by ZF and marketed under the name Active Kinematic Control (AKC) system which may incorporate the present invention.

The motor 102 comprises a stator 102a and a rotor 102b, the rotor 102b being connected to a pinion 106 which in turn is meshed to a rack 108 to form a rack and pinion gearbox. The rack 108 is formed towards the centre of a steering rod 110, and each end of the rod 110 is connected through a ball joint 112 to a forward track rod 114 that supports the wheel hub 104a for each rear wheel 104. The wheel 104 is also supported by additional links 116 to the vehicle body 118. The rack 108 can move to the left or right as shown in the drawing of FIG. 2 by rotation of the motor rotor 102b, and as it does so the track of both wheels 104 will be varied by equal amounts. The wheels 104 move together in parallel. The maximum angle of rotation is dependent on the geometry of the links 116 and track rods 114 and the range of movement of the rack 108 but will typically be set to +/−3 degrees from the straight ahead or centre position shown in FIG. 2. A portion of the system is shown photographically in FIG. 5.

The motor 102 in this example comprises a multi-phase DC electric motor, and may comprise a rotor 102b having, for example, six magnets mounted on it, which in this instance are arranged to provide six poles which alternate between north and south around the motor. A stator 102a, in this example, may comprise a nine-slot copper wound element having three groups of three teeth, each group of teeth having a common winding forming a respective phase. The motor 102 therefore passes through three complete electrical cycles on each full rotation of the rotor 102b.

Figure 6:
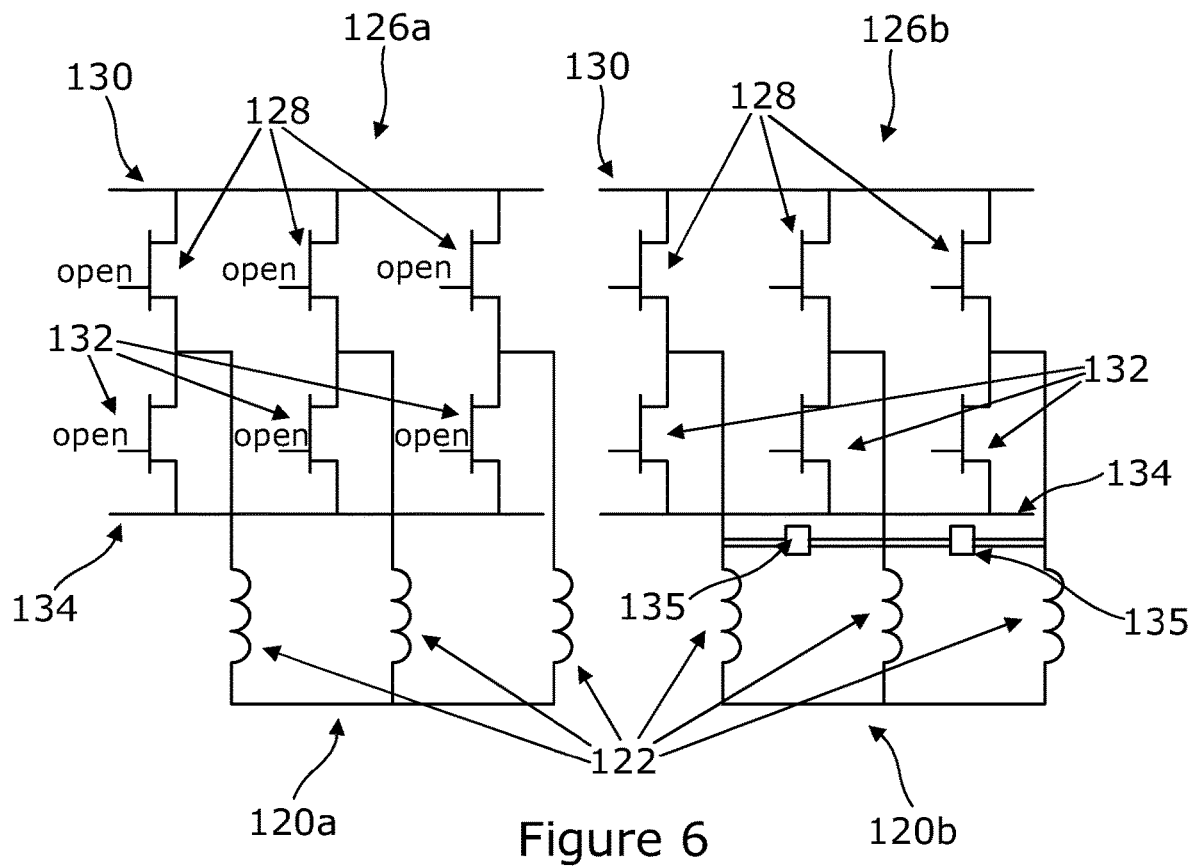
FIG. 6 shows one possible arrangement of the first and second motor phases windings and first and second motor bridges when a fault is detected.
Figure 7:
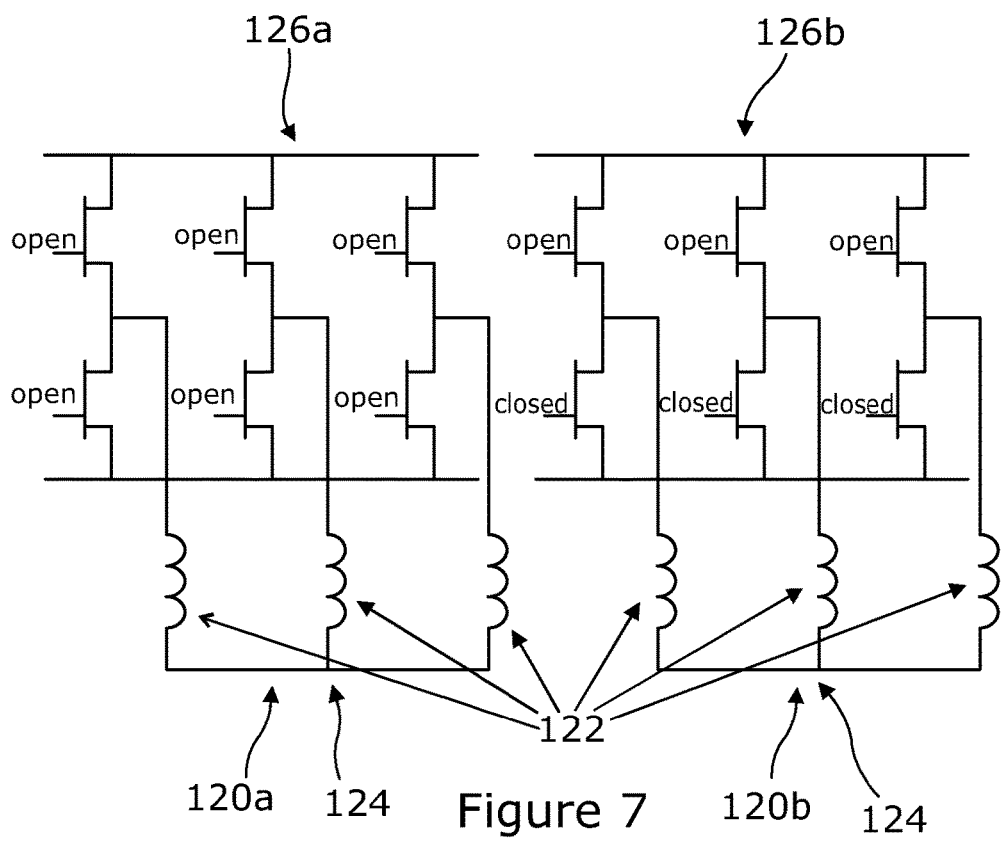
FIG. 7 shows an alternative possible arrangement of the first and second motor phases windings and first and second motor bridges when a fault is detected.

The stator 102a is provided with two sets of phase windings 120a, 120b as shown in FIGS. 6 and 7. The two sets 120a, 120b may be wound in parallel with each other but completely independent so there is no electrical connection between one set of phase windings and the other set. The motor may therefore by considered to be a dual wound motor, as it includes two sets of windings which can each independently be used to drive the motor when appropriate voltages are applied to them.

Each set of windings 120a, 120b comprises three phase windings 122 connected at a star point 124. The ends of each phase 122 furthest from the star point 124 are connected to a centre tap between the upper and lower switches of an arm of a three phase motor bridge circuit 126a, 126b. The two bridge circuits 126 are shown in FIG. 6 or FIG. 7. Each bridge circuit 126 therefore comprises 6 switches, typically MOSFETs.

The upper switches 128 of each bridge 126a, 126b are connected to a positive supply rail 130 and the lower switches 132 to a negative or ground rail 134. These switches 128, 132 can be opened and closed to selectively to connect the ends of the motor phases 122 to either the positive rail 130, the ground rail 134, or to leave the end of the phase isolated from both rails 130, 134.

It is important that at any time the upper switch 128 associated with each phase 122 and the corresponding lower switch 132 are not both closed at the same time as this will short the positive rail 130 to the ground rail 134. Therefore, the switches 128, 132 can at any time be held in any one of eight possible states.

In use the switches 128, 132 of the bridges 126a, 126b are modulated by PWM waveforms that in turn generate required voltage waveforms in each phase 122 of the motor 102. These PWM waveforms are calculated by the PWM driver in response to control signals supplied in normal operation to the bridge driver circuit. The Bridge driver circuit does not generate the PWM signals. These signals are supplied from the microcontroller, typically with one modulated signal line provided for each switching device.

Figure 3:
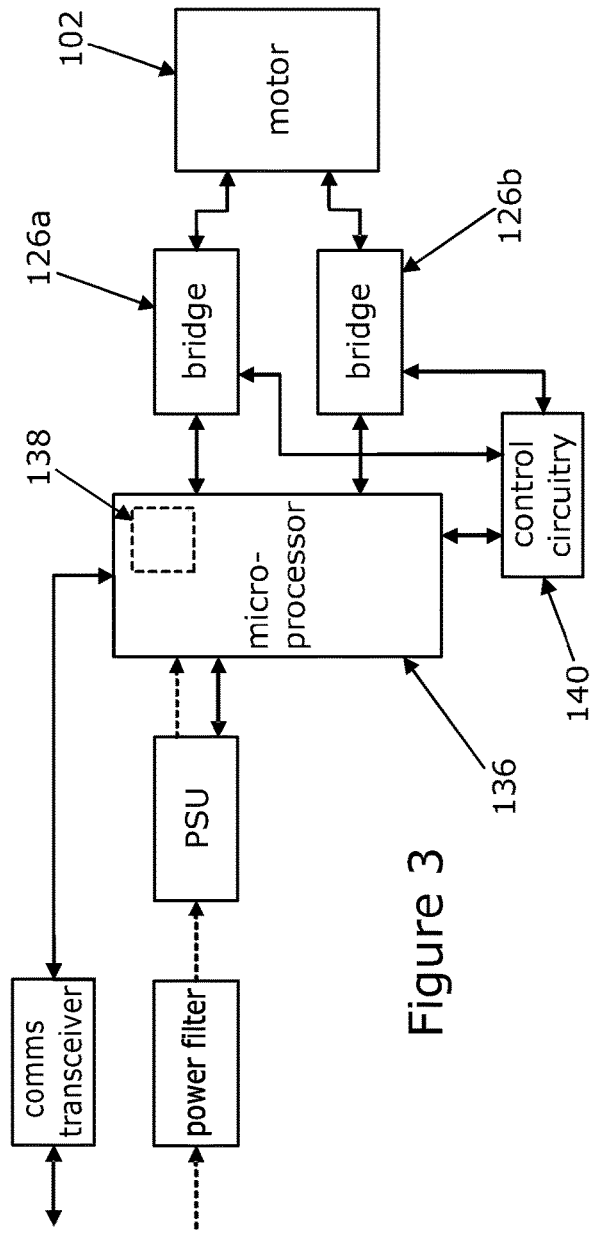
FIG. 3 is a block diagram showing in more detail the main parts of the control circuit and the motor of FIG. 2.
Figure 4:
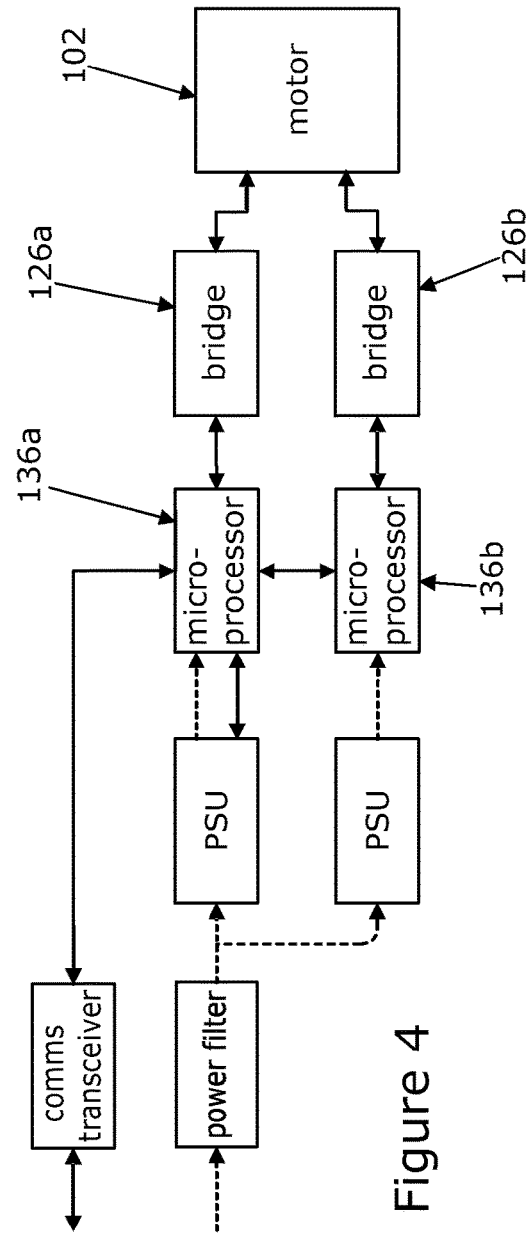
FIG. 4 shows a block diagram of the main parts of an alternative control circuit that may be used in the circuit of FIG. 2.

The control signals for both bridges 126a, 126b, or at least the first bridge driver circuit 126a, may be generated and supplied from a single microcontroller 136 shared between the two bridge circuits 126a, 126b as shown in FIG. 3 or from a dedicated microcontroller 136a, 136b for each bridge driver as shown in FIG. 4.

The use of two microcontrollers 136a, 136b may be preferred as it provides for a degree of redundancy that may allow the motor 102 to continue to operate in the event of a fault with one of the microcontrollers 136a, 136b.

The microcontroller(s) 136 receive(s), as an input, measurements of the steering position of the front wheels of the vehicle and of the position of the rear wheel track or motor position and also the speed of the vehicle. This information is processed to produce a desired track position for the rear wheels 104, and this position is then converted by the microcontroller 136 into a motor position control signals. These signals are fed to the motor bridge drive circuit 126a, 126b.

In the example shown, during normal operation of the system both of the circuits 126a, 126b shown in FIG. 3 and FIG. 4 the second phase windings 120b carry motor drive currents and as such share the drive of the motor rotor 102b.

Each Bridge driving one half of the Dual Wound Motor (i.e. one lane of the circuit) gives performance and packaging benefits because there is a requirement for only half the current to be carried in each bridge, bridge MOSFETs can be rated for half the current, dispersed power dissipation over the area of two Bridges etc.

Of course, it is also envisaged that during normal use only one of the phases is used to drive the motor, such as the first set. This is achieved by holding the switches of the second bridge 126b open so that there is no short circuit loop around the phases 122 and there is not voltage applied to any of the phases 122 of the second set of phases 120b. All motor drive is achieved by applying PWM voltages to the phases of the first set of phases 120a.

In the event of a fault where one of the sets of phases cannot drive the motor correctly, the other set of phases 120b are switched to control the movement or fix the position of the motor 102 as described below. A fault may be detected by a watchdog or fault detection circuit 138. By watchdog we mean a device used to detect software or hardware failures which may prevent the proper operation of the system. The watchdog or fault detection circuit 138 may be a part of or piggyback on the or each microcontroller or may instead be a separate circuit.

In the event that a fault is detected that is associated with one of the bridges (for example the first bridge driver or the first set of phases) then the switches of the other bridge 126b (for example the second bridge) may be moved to a condition in which a closed loop is formed around the second motor bridge 126b and at least two phases 122 of the second set of phase windings 120b which clamps the position of the motor winding.

For example, the second set of phase windings 120b may comprise three phase windings 122 and the second bridge 126b may comprise three upper switches 128, each of which connects one phase 122 to a positive supply voltage 130 and three lower switches 132, each of which connects a respective phase 122 to a negative or ground rail 134, and in the event of a fault the three bottom switches 132 may be moved to a closed circuit position or shorted out.

A dedicated circuit may be provided to switch on the required upper or lower switches (e.g. MOSFETs). This could be relatively simple e.g. a logic circuit with "AND" type functions (AND, OR, NOR, NAND, XOR and so on) which receives as an input a signal indicating that a fault condition has been detected from the watchdog, the output of which drives the switches.

The switches 128, 132 may be moved in response to control signals from the microcontroller 136, or from control signals generated by the watchdog or some additional microcontroller or control circuitry 140.

FIG. 7 shows this arrangement with the left hand circuit disabled so that no current can flow in any of the motor phases by opening all of the bridge switches, and the left hand circuit is used to provide damping by closing all the bottom switches and holding the upper switches open. Of course, in a modification all of the upper switches may be held closed and the bottom switches held open.

Alternatively, all three of the phase windings 122 of the second set of phase windings 120b may be shorted together using one or more additional switches 135 that do not form a part of the bridge circuit but are closed in response to the detection of the fault by the watchdog circuit. The closing of these switches may be under the control of the microprocessor or the additional circuitry that is controlled by the watchdog or is part of the watchdog. These switches 135 may be normally opened. This is shown conceptually in FIG. 6 of the drawings, where the left hand circuit corresponds to the faulty circuit and the right hand one is used to damp the motor movement.

In another arrangement, the phases 122 of the second set of phase windings 120b may be connected in a star formation with one or more switches provided at the star point 124 that in normal operation are open to isolate the phases but in a fault condition are closed to form a closed loop around the second set of phase windings.

In the event that the watchdog detects a fault, the first bridge 126a and/or the phases 122 of the first set of phases 120a may be placed in a condition where it is unable to drive the motor 102. For instance a switch may be provided at the star point 124 of the first set of phases 120a, or two switches, which may be opened in a fault condition to ensure the first set of phases 120a cannot drive the motor rotor.

The effect of the closed loop around the motor phases is to provide damping that holds or tries to hold the motor rotor 102b in position when the watchdog detects a fault. This damping would primarily assist in slowing/stopping the motor under high motor speed conditions and as such will prevent sudden uncontrolled changes in rear wheel track. It is recognised that there will be Little or no Damping possible @ 0 rpm/low motor speeds, but in this case typically the friction of the system is sufficient to hold the wheel position at low speed; the extra damping, only, being required to slow the motor/wheel movement to "safe" levels.

The location of the "watchdog or fault detection circuit" depends upon the components used. If two microcontrollers are used, one for each of two bridges, each micro may be provided with a watchdog. This could be provided within the micro, but high integrity (e.g. ASIL-D) solutions prefer the watchdog to be external to eliminate common cause faults. For fully robust operation each Bridge Driver may be provided with an associated watchdog (plus under/over-voltage detection etc. which is considered part of the watchdog within the meaning of this description) to monitor micro functionality.

The applicant recognizes that the rear wheel or wheels 104 may fail in a position that is offset from the straight-ahead condition. This will result in the vehicle crabbing slightly down the road when driven in a straight line but this will generally be acceptable as it gives a predictable steering kinematics and may not even be noticed by many drivers if the range of rear track angles permitted is low, i.e. less than 3 degrees or so.

To ensure adequate damping, the configuration of the phase windings of the second set of phase windings 120b should be such that the back EMF generated (motor braking torque) is sufficiently great that it exceeds the torque that can be applied onto the motor by the rear wheels 104 as they attempt to change track under motion of the vehicle along a highway. This will be a relatively low torque as the side forces on the wheels will in turn be relatively low at the motor rotor pinion.

Two or more of the phases may be shorted, and preferably all of the phases of the second set of phase windings may be shorted out.

Figure 8:
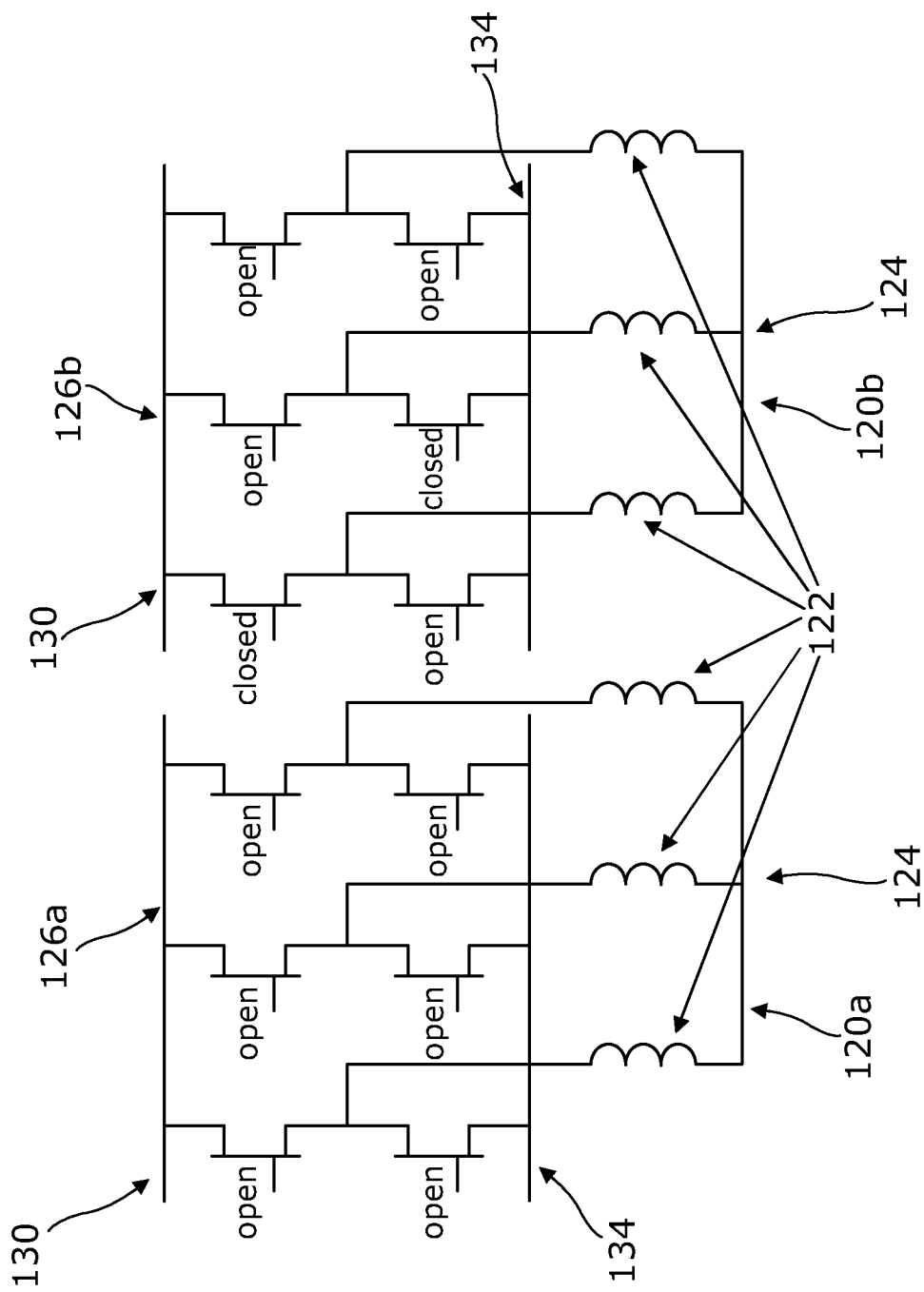
FIG. 8 shows a still further alternative arrangement in which two phases are connected together and a DC current flows through the phases to clamp the rotor against movement.

In an alternative to damping, as shown in FIG. 8 of the drawings, two of the phase windings 122 of the non-faulty set of phase windings 120b (or the phase windings associated with the non-faulty bridge or associated microcontroller) may be connected in line between the positive and ground rail 130, 134 so that they carry a relatively high DC current that causes the rotor to be clamped in position. This can be achieved by closing a top switch of one phase 122 and a bottom switch of another whilst all other switches are held open. The rotor will then move a small amount until it is aligned with the field created by the high current and will then resist further movement. Care needs to be taken to limit the current that can flow to prevent damage to the windings 122 but the skilled person will understand how to prevent such damage occurring by monitoring and controlling the current in the two phases.

In a still further alternative, rather than damping movement or clamping to prevent movement, upon initially detecting a fault the phase windings that are not faulty or that are associated with the non-fault bridge or associated microprocessor may be provided with pulse width modulated signals that cause the motor to move the rear wheel or wheels back to a straight ahead position.

Once in the straight ahead position the motor may be damped or clamped as described hereinbefore.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

The invention claimed is:

1. A vehicle kinematic control circuit for a vehicle, the circuit in use adjusting the track of one or more rear wheels of the vehicle through a limited angular range, in which the circuit comprises:
   an electric motor, the motor in use being connected mechanically to at least one rear wheel of the vehicle such that angular movement of the rotor of the motor causes an angular variation of the track of the rear wheel,
   the motor comprising a stator and a rotor and at least two independently operable sets of phase windings, each set comprising at least two phase windings,
   a motor bridge driver circuit comprising at least two motor bridges, a first one of the motor bridges being connected to one of the sets of phase windings and a second motor bridge being connected to a different set of the set of phase windings, and
   one or more microcontrollers which each generate motor control signals for supply to at least one associated motor bridges,
   whereby in normal operation at least one of the microcontrollers generates motor control signals that are passed to the at least one associated motor bridge in turn to apply appropriate PWM modulated voltage waveforms to the set of phase windings connected to that bridge to drive the rotor of the motor in a first manner thereby to actively steer the rear wheel, and characterised by further comprising:
   a fault detection circuit which monitors the operation of the at least one microcontroller, the motor bridge driver circuit, and the at least two sets of phase windings, thereby to detect a fault condition,
   in which in the event of a fault condition being detected the circuit is adapted to cause one of the non-faulty motor bridges and an associated non-faulty set of phase windings to be operated to drive the rotor of the motor in a second, different manner.

2. The vehicle kinematic control circuit according to claim 1 arranged in the event of a fault condition to drive the non faulty bridge and phase windings of the rotor in the second manner so as to clamp the motor rotor in position to prevent unwanted movement.

3. The vehicle kinematic control circuit according to claim 1 arranged in the event of a fault condition to drive the non faulty bridge and phase windings of the rotor in the second manner by initially applying PWM voltage waveforms to the non-faulty phase that cause the rear wheel to be driven to a predefined track position such as a straight ahead position.

4. The vehicle kinematic control circuit according to claim 1 arranged in the event of a fault condition to drive the non faulty bridge and phase windings of the rotor in the second manner so as to damp unwanted movement of the rear wheel.

5. The vehicle kinematic control circuit as claimed in claim 1, wherein both sets of windings and the corresponding bridge driver circuit are operated to drive the motor so that the two work in tandem and, in the event that a fault is detected with one set of phase windings or the associated driver or microcontroller, the system is arranged to stop using one set associated with the fault whilst the other set is used to damp the movement of the motor.

6. The vehicle kinematic control circuit as claimed in claim 1, in which during normal operation one set of phases are used to drive the motor whilst the other set of phases are held in an inactive state where they do not provide drive to the motor, in the event of a fault being detected that affects the drive of the motor the other set of windings being operable to provide the damping.

7. The vehicle kinematic control circuit as claimed in claim 1, further comprising additional control circuitry that in a fault state provides the required signals for operation of the bridge switches of the other (non-faulty) bridge driver/phases.

8. The vehicle kinematic control circuit as claimed in claim 7, wherein the additional control circuitry provides control signals to the other (non-faulty) bridge driver that are additional to or that replace the control signals generated by the at least one microcontroller.

9. The vehicle kinematic control circuit as claimed in claim 7, wherein the additional control circuitry is located in series between the microcontroller and the bridge driver circuit.

10. The vehicle kinematic control circuit as claimed in claim 7, wherein the fault detection circuit comprises a watchdog that monitors the operation of the microcontroller and the watchdog, or the watchdog plus the microcontroller, provides the fault detection circuit functionality of monitoring the bridge driver(s) and phase windings for faults.

11. The vehicle kinematic control circuit as claimed in claim 10, wherein the watchdog provides signals to the additional control circuitry when a fault is detected to cause the additional control circuitry to cause the other phase windings to drive the motor in the second manner.

12. The vehicle kinematic control circuit as claimed in claim 9, wherein a single microcontroller is provided that provides signals for both bridges as required.

13. The vehicle kinematic control circuit as claimed in claim 1, wherein dual microcontrollers are provided with each microcontroller controlling one bridge and associated set of phase windings, where the fault detection circuit is built into the two microcontrollers such they the microcontrollers monitor the bridge drivers for faults and also monitor each other for faults.

14. The vehicle kinematic control circuit as claimed in claim 4, wherein, in the event that a fault is detected that is associated with one of the bridges or sets of windings that in normal use drives the motor, the switches of the other bridge may be moved to a condition in which a closed loop is formed around the other motor bridge and at least two phases of that other set of phase windings which damps the movement of the motor.

15. The vehicle kinematic control circuit as claimed in claim 14, wherein each of the sets of phase windings comprises three phase windings and the bridge comprises three upper switches, each of which connects one phase to a positive supply voltage, and three lower switches, each of which connects a respective phase to a negative or ground rail, and in the event of a fault the three bottom switches or the three top switches of the other bridge that is used to control the motor position or movement are moved to a closed circuit position or shorted out.

16. The vehicle kinematic control circuit as claimed in claim 1, wherein, in the event that a fault is detected by the fault detection circuit, the faulty bridge and/or the phases of the faulty set of phases are placed in a condition where it is unable to drive the motor.

17. The vehicle kinematic control circuit as claimed in claim 1, wherein the microcontroller, or dual microcontrollers, in normal use drive the motor to cause the rear track to change in phase with the track of the front wheels or to drive it to change track out of phase with the front wheels of the vehicle.

18. The vehicle kinematic control circuit as claimed in claim 1, further comprising a timer which is triggered when a fault is detected by the fault detection circuit and whereby, upon reaching a predefined elapsed time, the timer generates an alert signal or reduces the operating capabilities of the vehicle.

19. The vehicle kinematic control circuit as claimed in claim 1 further comprising a part of a front wheel steer vehicle in which the motor is connected to at least one rear wheel of the vehicle.

20. The vehicle kinematic control circuit as claimed in claim 16, wherein the vehicle has four wheels—two steered front wheels and two rear wheels controlled by the vehicle kinematic control circuit of the invention.

21. The vehicle kinematic control circuit as claimed in claim 1, further comprising a rack and pinion, the rack in use being connected to at least one rear wheel carrier and the pinion being fixed to and rotating with the motor rotor.

* * * * *